United States Patent
Hentrich et al.

(10) Patent No.: US 12,351,894 B2
(45) Date of Patent: Jul. 8, 2025

(54) POWDER MADE OF A COBALT-CHROMIUM ALLOY

(71) Applicant: VDM Metals International GmbH, Werdohl (DE)

(72) Inventors: Tatiana Hentrich, Werdohl (DE); Christina Somsen, Bochum (DE); Peter Steinbach, Cologne (DE)

(73) Assignee: VDM Metals International GmbH, Werdohl (DE)

( * ) Notice: Subject to any disclaimer, the term of this patent is extended or adjusted under 35 U.S.C. 154(b) by 47 days.

(21) Appl. No.: 17/794,154

(22) PCT Filed: Mar. 22, 2021

(86) PCT No.: PCT/DE2021/100279
§ 371 (c)(1),
(2) Date: Jul. 20, 2022

(87) PCT Pub. No.: WO2021/190704
PCT Pub. Date: Sep. 30, 2021

(65) Prior Publication Data
US 2023/0106938 A1   Apr. 6, 2023

(30) Foreign Application Priority Data

Mar. 26, 2020 (DE) ...................... 10 2020 108 346.7
Mar. 18, 2021 (DE) ...................... 10 2021 106 606.9

(51) Int. Cl.
*C22C 19/07* (2006.01)
*B22F 3/15* (2006.01)
(Continued)

(52) U.S. Cl.
CPC ................ *C22C 19/07* (2013.01); *B22F 3/15* (2013.01); *B22F 9/082* (2013.01); *B22F 10/28* (2021.01);
(Continued)

(58) Field of Classification Search
CPC ......... C22C 19/07; C22C 1/0433; B22F 3/15; B22F 9/082; B22F 10/28;
(Continued)

(56) References Cited

U.S. PATENT DOCUMENTS

| | | |
|---|---|---|
| 3,859,086 A | 1/1975 | Church et al. |
| 4,464,206 A | 8/1984 | Kumar et al. |

(Continued)

FOREIGN PATENT DOCUMENTS

| | | |
|---|---|---|
| CN | 1497050 A | 5/2004 |
| CN | 101144131 A | 3/2008 |

(Continued)

OTHER PUBLICATIONS

CN-107365925-A, Chen et al. Machine translation. (Year: 2017).*

(Continued)

*Primary Examiner* — John A Hevey
(74) *Attorney, Agent, or Firm* — Collard & Roe, P.C.

(57) ABSTRACT

A titanium-free cobalt-chromium alloy for a powder, contains (in wt. %) C 0.40-1.50%, Cr 24.0-32.0%, W 3.0-8.0%, Mo 0.1-5.0%, where 4.0<W+Mo<9.5 is satisfied by the content of W and Mo in wt. %, Nb max. 0.5%, Ta max. 0.5%, where Nb+Ta<0.8 is satisfied by the content of Nb and Ta in wt. %, Ni 0.005-25.0%, Fe 0.005-15.0%, where Ni+Fe>3.0 is satisfied by the content of Ni and Fe in wt. %, Mn 0.005-5.0%, Al max. 0.5%, N 0.0005-0.15%, Si<0.3%, Cu max. 0.4%, O 0.0001-0.1%, P max. 0.015%, B max. 0.015%, S max. 0.015%, residual Co, and impurities resulting from the production process, in particular Zr max. 0.03% and Ti max. 0.025%.

3 Claims, 1 Drawing Sheet

(51) Int. Cl.
  *B22F 9/08* (2006.01)
  *B22F 10/28* (2021.01)
  *C22C 1/04* (2023.01)
  B33Y 10/00 (2015.01)
  B33Y 70/00 (2020.01)

(52) U.S. Cl.
  CPC .... *C22C 1/0433* (2013.01); *B22F 2009/0848* (2013.01); *B33Y 10/00* (2014.12); *B33Y 70/00* (2014.12)

(58) Field of Classification Search
  CPC .. B22F 2009/0848; B22F 10/10; B22F 10/20; B33Y 10/00; B33Y 70/00; C22F 1/10; Y02P 10/25
  See application file for complete search history.

(56) References Cited

U.S. PATENT DOCUMENTS

| | | | | |
|---|---|---|---|---|
| 6,986,951 | B2 * | 1/2006 | Giannozzi | C23C 30/00 420/580 |
| 8,075,839 | B2 | 12/2011 | Srivastava | |
| 10,946,449 | B2 | 3/2021 | Gerking et al. | |
| 2008/0179034 | A1 * | 7/2008 | Forbes Jones | C23C 4/123 164/250.1 |
| 2013/0263977 | A1 | 10/2013 | Rickenbacher et al. | |
| 2016/0258298 | A1 | 9/2016 | Channel et al. | |
| 2017/0241287 | A1 | 8/2017 | Nakamura et al. | |

FOREIGN PATENT DOCUMENTS

| | | | | | |
|---|---|---|---|---|---|
| CN | 106884101 | A | | 6/2017 | |
| CN | 107338371 | A | | 11/2017 | |
| CN | 107365925 | A | * | 11/2017 | |
| CN | 107 695 342 | A | | 2/2018 | |
| CN | 108130530 | A | * | 6/2018 | ............ B22F 1/0048 |
| CN | 108705093 | A | | 10/2018 | |
| DE | 22 63 858 | A | | 7/1973 | |
| DE | 10 2013 022 096 | A1 | | 6/2015 | |
| EP | 1 403 397 | A1 | | 3/2004 | |
| EP | 3 278 907 | A1 | | 2/2018 | |
| EP | 3 453 775 | A1 | | 3/2019 | |
| JP | S60131936 | A | | 7/1985 | |
| JP | 60177993 | A | * | 9/1985 | ......... B23K 35/3046 |
| JP | S61243143 | A | | 10/1986 | |
| JP | S62-33090 | A | | 2/1987 | |
| JP | S62-142705 | A | | 6/1987 | |
| JP | S62-192506 | A | | 8/1987 | |
| JP | 2016-029217 | A | | 3/2016 | |

OTHER PUBLICATIONS

CN-108130530-A, Ge et al. Machine translation. (Year: 2018).*
JP60177993A, machine translation. (Year: 1985).*
International Search Report in PCT/DE2021/100279, dated Jun. 17, 2021.
Matthews S. J. et al: Weldability Characteristics of a New Corrosion- and Wear-Resistant Cobalt Alloy, Hot cracking sensitivity and weldment mechanical properties of a new cobalt-based alloy are investigated and characterized; Dec. 1991, Welding Research Supplement, 331-s to 338-s (p. 331, third column, second paragraph, table 1), 8 pages.
"Deutsche Edelstahlwerke: Schematischer 'Stammbaum'—Celsite (Kobalt-Basis-Legierungen)", 2013, p. 1.
Notification of Transmittal of Translation of the International Preliminary Report on Patentability, mailed Oct. 6, 2022, in PCT/DE2021/100279, with English translation of the International Preliminary Report on Patentability dated Sep. 22, 2022 and English translation of the Written Opinion of the International Searching Authority mailed Jun. 17, 2021.

* cited by examiner

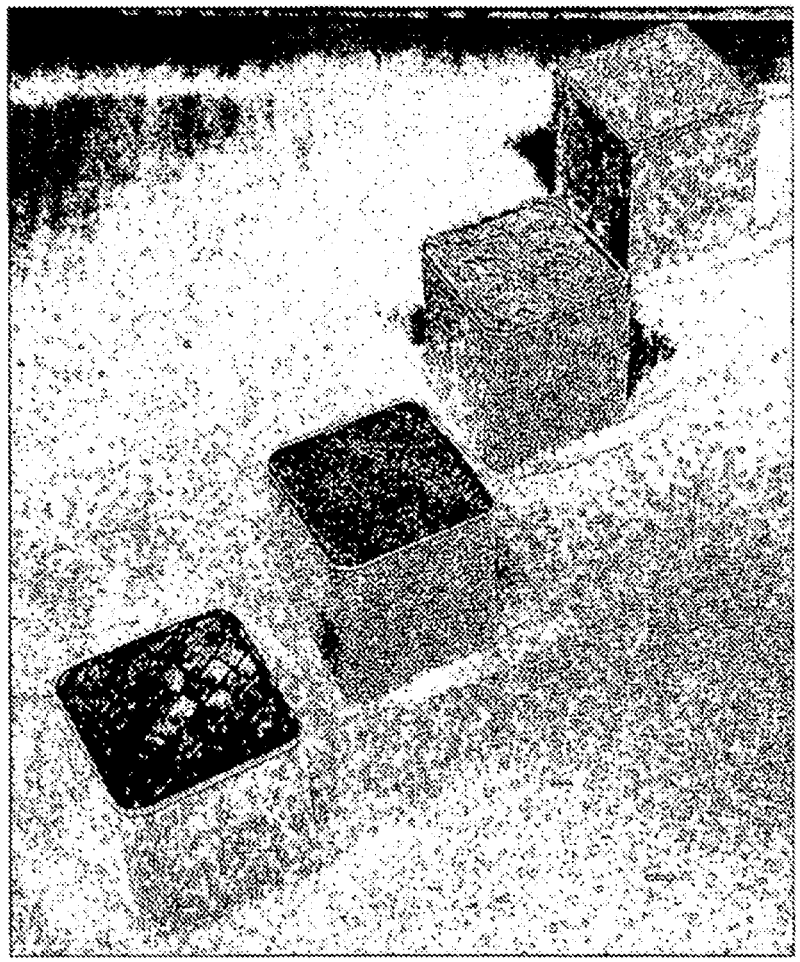

POWDER MADE OF A COBALT-CHROMIUM ALLOY

CROSS REFERENCE TO RELATED APPLICATIONS

This application is the National Stage of PCT/DE2021/100279 filed on Mar. 22, 2021, which claims priority under 35 U.S.C. § 119 of German Application Nos. 10 2020 108 346.7 filed on Mar. 26, 2020 and 10 2021 106 606.9 filed on Mar. 18, 2021, the disclosures of which are incorporated by reference. The international application under PCT article 21(2) was not published in English.

The invention relates to a chemical composition for powder of a cobalt-chromium alloy.

An important feature of cobalt-chromium alloys is their high wear resistance, which is ensured by specified alloying ingredients, especially carbides. These alloys normally do not contain any other strengthening phases such as coherent FCC $(Co, Ni)_3Ti$, which are analogous to $\gamma'$ phases in nickel-base alloys. The typical carbides in Co-base wear-resistant materials are MC, $M_6C$, $M_7C_3$ and $M_{23}C_6$ precipitates. The following elements are understood by "M": MC ((Ta, Ti, Zr, Nb, W, Cr) C), $M_6C$ ((Cr, Mo, W, $Co)_6C$), $M_7C_3$ ((Cr, Mo, W, $Co)_7C_6$) and $M_{23}C_6$ ((Cr, Mo, W, $Co)_{23}C_6$), which are considered here to be essential but not exclusive. Due to the high wear resistance, these materials are difficult to process. Therefore the hot isostatic pressing (HIP) has gained in importance as a method for the manufacture of solid component parts as well as build-up welding and/or spraying for the surface treatments.

Stellites (trademark of Kennametal) are described in the materials diagram published by Deutsche Edelstahlwerke as the Celsite (trademark of DEW) "Family Tree" (cobalt-base alloys) in 10.2013. One of the most widely used Stellite types is Stellite no. 6 (UNS R30006), consisting of (in wt-%) C 1.1%, Cr 28.0%, W 4.5%, Ni 1.0%, Fe 1.0%, Co the rest, which has also been assigned to the "crack-free welding behavior" category due to its C content. Among other properties, this alloy exhibits a good combination between corrosion resistance, wear resistance and hardness. However, Stellite no. 6 has a small elongation to break of approximately 1%.

In generative fabrication methods, not only the chemical composition of the alloy but also the phase transformation is an important factor, since during processing the danger exists of crack formation on the basis of segregation effects and due to additional stresses caused by dissolution of the phases. Moreover, from a certain C content on, the cobalt-chromium alloys exhibit, during the solidification process, a eutectic reaction that introduces additional stresses into the material and, if the material naturally has lower ductility, leads to crack formation. This generally makes the welding of wear-resistant cobalt-chromium alloys more difficult.

The strongly segregating elements, such as B, Zr and Si, reduce the weldability of nickel and nickel-cobalt alloys. B, Zr and Si segregate strongly during solidification and increase the hot-cracking tendency enormously. Moreover, the processability in generative fabrication methods is impaired by the elements S, 0, N, P, Pb.

JP S61243143 A discloses a superplastic cobalt alloy having defined grain sizes of ≤10 μm, consisting of (in wt-%) C 0.15-1.0%, Cr 15.0-40.0%, W or Mo 3.0-15.0%, B less than 1.0%, Ni 0-20%, Nb 0-1.0%, Zr 0-1.0%, Ta 0-1.0%, Ti 0-3.0%, Al 0-3.0%, Co the rest.

US 2017/0241287 A1 discloses a powder-metallurgical cobalt alloy consisting of (in wt-%) C 0.05-0.8%, Cr 25.0-32.0%, W 4.0-10.0%, Ni 5-15%, Fe 0.5-2.0%, Si 0.3-1.5%, Co the rest. Moreover, a series of elements—Ti, V, Y, Zr, Nb, Hf and Ta—is defined, which are described as follows: one element is mentioned as the first, with wt-% of 0.01-0.5%, plus another must be mentioned as a second element that in the Periodic Table has a higher group number or in the same group has a higher period number and is present in wt-% of 0.01-0.5%.

US 2016/0258298 A1 discloses a method for the manufacture of metallic component parts in almost final geometry with examples of various nickel-base and cobalt alloys such as FSX414 and Mar-M-509.

EP 3453775 A1 discloses a cobalt alloy and parts produced from it by means of generative fabrication methods, consisting of (in wt-%) C 0.08-0.25%, B less than 0.1%, Cr 10.0-30.0%, W and/or Mo 5.0-12.0%, Ni and Fe in total up to 30%, wherein Fe is less than 5.0%, Ti, Zr, Nb and Ta in total of 0.5-2.0%, Si up to 0.5%, Mn up to 0.5%, N of 0.003-0.04%, Co the rest.

EP 3278907 A1 discloses a metallic powder based on Ni, Fe and Co of at least 50-wt %. At least one of the following elements is represented in the powder: C, Si, Cr, Mo, Al, Ti, V, W, Nb, Zn, Ta, B, Ag, Cu and Sn as well as other process-related impurities. These particles have a spherical particle shape with 10% particle size D10 of 10 μm or larger, and their volume Y of 7.5-24.0 calculated according to the following formula: $Y=D50 \times \rho \times S$, in which D50 represents particle sizes of 50 vol-% powder, $\rho$—actual density of powder and S—specific surface of powder.

The objective of the subject matter of the invention is to provide a titanium-free cobalt-chromium alloy, by which a generative fabrication with good processability of almost crack-free microstructure of component parts is possible. At the same time, it is intended that component parts of the alloy according to the invention will have a combination of elevated elongation to break as well as higher hardness and thus an increased wear resistance, oxidation resistance and corrosion resistance at moderate application temperatures.

The objective of the subject matter of the invention is also to provide a method for generation of a titanium-free cobalt-chromium alloy by which a high quality of the powder can be achieved.

A further objective consists in making the alloy accessible to particular application situations.

The objective is accomplished by a titanium-free cobalt-chromium alloy for powder, consisting of (in wt-%)

C 0.40-1.50%
Cr 24.0-32.0%
W 3.0-8.0%
Mo 0.1-5.0%, wherein 4.0≤W+Mo≤9.5, with the contents of W and Mo in wt-%, is satisfied
Nb max. 0.5%
Ta max. 0.5%, wherein Nb+Ta≤0.8, with the contents of Nb and Ta in wt-%, is satisfied
Ni 0.005-25.0%
Fe 0.005-15.0%, wherein Ni+Fe>3.0, with the contents of Ni and Fe in wt-%, is satisfied
Mn 0.005-5.0%
Al max. 0.5%
N 0.0005-0.15%
Si<0.3%
Cu max. 0.4%
O 0.0001-0.1%
P max. 0.015%
B max. 0.015%
S max. 0.015%

Co the rest and manufacturing-related impurities, especially

Zr max. 0.03%

Ti max. 0.025%.

Advantageous further developments of the alloy according to the invention can be inferred from the associated dependent claims.

The further objective is also accomplished by a method for manufacture of a powder from this alloy, in that the alloy is smelted in a vacuum induction smelting furnace and atomized in a closed atomization system, wherein the melt is fed through a nozzle to a supplied gas stream having a specified gas flow rate and the solidified powder particles are collected in a gas-tightly sealed container.

Preferably, the following relationships are to be satisfied, especially after a heat treatment:

10.0 volume-% $\leq M_{23}C_6 \leq$ 40.0 volume-% and $M_7C_3 \leq$ 10.0 volume-%

The alloy according to the invention is preferably usable as powder for generative fabrication methods and/or with combination of HIP methods, for the HIP methods as well as for the build-up welding and/or coating.

Preferred configurations of the use can be inferred from the associated dependent claims.

In the following, all concentration values are indicated in wt-% unless otherwise expressly noted.

The carbon content lies between 0.40 and 1.50%, wherein preferably defined contents may be adjusted within the range of values:

0.40 to 1.40%

0.42 to 0.95%

>0.65 to 1.50%

This is true in the same way for the element chromium, which is adjusted to contents between 24.0 and 32.0%. Preferred contents may be obtained as follows:

25.0 to 31.0%

>25.0 to 31.0%

26.0 to 31.0%

This is likewise true for the element molybdenum, which is adjusted to contents between 0.1 and 5.0%. Preferred contents may be obtained as follows:

0.1 to 4.0%

0.1 to <4.0%

0.1 to 3.0%

Furthermore, it is favorable to add tungsten with a content of 3.0 to 8.0% to the alloy, wherein 4.0≤W+Mo≤9.5, with the contents of W and Mo in wt-%, must be satisfied. Preferred ranges are obtained for:

4.2≤W+Mo≤9.0%

The Zr content is adjusted to max. 0.03% (impurity). Preferably, a restriction is applied to:

max. 0.025% max. 0.020%

The Hf content is likewise limited to max. 0.015%. Preferably, a restriction is applied to:

max. 0.010% max. 0.008%

Furthermore, titanium is limited to a content of max. 0.025% (impurity), wherein Zr+Hf+Ti≤0.04, with the contents of Zr, Hf and Ti in wt-%, must be satisfied. Preferred ranges are obtained for:

Zr+Hf+Ti≤0.035%

Zr+Hf+Ti≤0.030%

The Nb content is limited to max. 0.5%. Preferably, a restriction is applied to:

max. 0.4% max. 0.3%

Furthermore, Ta is limited to a content of max. 0.5%, wherein Nb+Ta≤ 0.8, with the contents of Nb and Ta in wt-%, must be satisfied. Preferred ranges are obtained for:

Nb+Ta≤0.6%

Nb+Ta≤0.5%

This is true in the same way for the element nickel, which is adjusted to contents between 0.005 and 25.0%. Preferred contents may be obtained as follows:

0.005 to 24.0%

0.005 to 21.0%

0.005 to 15.0%

>2.0 to 14.0%

>3.0 to 21.0%

>5.0 to 21.0%

This is likewise true for the element iron, which is adjusted to contents between 0.005 and 15.0%. Preferred contents may be obtained as follows:

0.05 to 15.0%

0.05 to 10.0%

0.05 to 8.0%

>2.0 to 10.0%

>3.0 to 10.0%

The Mn content lies between 0.005 and 5.0%, wherein defined contents may be preferably adjusted within the range of values:

0.005 to 4.5%

0.005 to 4.0%

>2.0 to 5.0%

The Al content is likewise limited to max. 0.5%. Preferably, a restriction is applied to:

max. 0.35% max. 0.25%

The N content lies between 0.0005 and 0.15%, wherein defined contents may be preferably adjusted within the range of values:

0.001 to 0.12%

0.001 to 0.10%

The Si content is limited to <0.3%. Preferably, a restriction is applied to:

max. 0.25% max. 0.20%

The element Cu is limited to max. 0.4% in the alloy. Preferably, a restriction is applied to:

max. 0.3%

The oxygen content lies between 0.0001 and 0.1%. The following restrictions of the oxygen content are conceivable:

0.001 to 0.1%

0.002 to 0.08%

0.002 to 0.06%

0.002 to 0.05%

The B content is limited to max. 0.015%. Preferably, a restriction is applied to:

max. 0.012%

The sulfur content is likewise limited to max. 0.015%. Preferably, a restriction is applied to:

max. 0.010%

Finally, as further impurities, the following elements, which cannot be excluded, may also be present as follows:

Pb max. 0.005%

Zn max. 0.005%

Sn max. 0.005%

Bi max. 0.005%

V max. 0.005%

Y max. 0.005%

La max. 0.005%

The following relationships must be satisfied, especially after a heat treatment: 10.0 volume-% $\leq M_{23}C_6 \leq$ 40.0 volume-% and $M_7C_3 \leq 10.0$ volume-%. Preferred ranges, especially after a heat treatment, are obtained for: 13.0 volume-% $\leq M_{23}C_6 \leq 38.0$ volume-% and $M_7C_3 \leq 8.0$ volume-%.

In the following, a method is presented for manufacture of a powder from a cobalt-chromium alloy according to the invention, in that an alloy is smelted in a vacuum induction smelting furnace, a closed atomization system is adjusted with a supplied gas, the melt is fed through a nozzle to a gas stream having a specified gas flow rate, the solidified powder particles are collected in a gas-tightly sealed container.

The powder according to the invention is preferably produced in a vacuum inert-gas atomization system (VIGA). In this system, the alloy is smelted in a VIM furnace and the molten melt is held for 20 minutes to 2 hours for homogenization. The melt is passed into a casting gate, which leads to a gas stream, in which the molten metal is atomized to metal particles under high pressure of 5 to 100 bar with inert gas. The melt is heated in the melting crucible at 5 to 400° C. above the melting point. The metal flow rate during atomization is 0.5 to 80 kg/min and the gas flow rate is 2 to 150 m³/min. Due to the rapid cooling, the metal particles solidify in the form of balls (spherical particles). The inert gas used for the atomization may if necessary contain 0.01 to 100% nitrogen. The gas phase is then separated from the powder in a cyclone, after which the powder is packaged. In the process, the particles have a particle size of 5 μm to 250 μm, gas inclusions of 0.0 to 4% pore area (pores <1 μm) relative to the total area of evaluated objects, a bulk density of 2 up to the density of the alloy of approximately 8.5 g/cm³ and are packaged air-tightly under a shield gas atmosphere containing argon.

The range of values for the particle size of the powder lies between 5 and 250 μm, wherein preferred ranges lie between 5 and 150 μm or 10 and 150 μm. The preferred ranges are obtained by separation of too-fine and too-coarse particles by means of sieving and sifting processes. These processes take place under shield gas atmosphere and may be carried out one or more times.

The inert gas for powder manufacture may optionally be argon or a mixture of argon with 0.01 to <100% nitrogen. Possible restrictions of the nitrogen content may be:

0.01 to 80%
0.01 to 50%
0.01 to 30%
0.01 to 20%
0.01 to 10%
0.01 to 10%
0.1 to 5%
0.5 to 10%
1 to 5%
2 to 3%

Alternatively, the inert gas may optionally be helium.

The inert gas should preferably have a purity of at least 99.996 vol-%. In particular, the it should have a nitrogen content should have from 0.0 to 10 ppmv, the oxygen content from 0.0 to 4 ppmv and an $H_2O$ content of $\leq 5$ ppmv.

In particular, the inert gas may preferably have a purity of at least 99.999 vol-%. In particular, the it should have a nitrogen content should have from 0.0 to 5 ppmv, the oxygen content from 0.0 to 2 ppmv and an $H_2O$ content of $\leq 3$ ppmv. The dew point in the system lies in the range of −10 to −120° C. Preferably, it lies in the range of −30 to −100° C.

The pressure during the powder atomization may preferably be 10 to 80 bar.

The component parts and components or layers on component parts and components manufactured by means of additive fabrication are built up from layer thicknesses of 5 to 500 μm and have a textured microstructure directly after the manufacture, with grains elongated in build-up direction having a mean grain size of 2 μm to 1000 μm. The preferred range lies between 5 μm and 500 μm. A component-part fabrication may take place if necessary with heating of the building-up space and/or with in situ heat treatment by laser control.

Moreover, the powder described above may be used if necessary for the manufacture of the component parts by means of HIP or conventional sintering and extrusion pressing processes. Furthermore, a method combination of additive fabrication and subsequent HIP treatment is possible. In the process, the post-processing steps described below for the generative fabrication are possibly to be used for HIP component parts.

Likewise, the alloy according to the invention may be used if necessary for the build-up welding on metallic components of any type. In this way the high wear resistance, hardness with very good corrosion and oxidation resistance are achieved in combination with crack-free or almost crack-free microstructure and improved ductility in comparison with Stellite no. 6.

Moreover, the alloy according to the invention may be suitable for binder jetting methods. In this method, component parts are built up in layers, although, in comparison with laser-melting methods, an organic binder, which ensures cohesion of the powder particles, is introduced locally. After hardening of the binder, the so-called green part is freed from the non-bonded powder, after which the binder is removed and the part is sintered.

The methods and additional apparatuses for pre-heating and post-heating may be of advantage for the alloy according to the invention. EBM methods—electron beam melting—may be considered as an example. The powder bed is selectively melted in layers by the electron beam. The process takes place under high vacuum. Therefore this process is suitable in particular for hard materials, which have lower ductility, and/or for reactive materials. The pre-heating and/or post-heating may likewise be implemented in laser-based methods. The component parts and components or layers on component parts and components manufactured by means of additive fabrication and other methods described above may be subjected optionally to a homogenization, stress-relief, solution and/or precipitation-hardening annealing. The heat treatments may be conducted if necessary under vacuum or shield gas, such as, for example, argon or hydrogen, followed by a cooling in the furnace, if necessary under shield gas, in air, in the agitated annealing atmosphere or in the water bath.

The component parts may be annealed if necessary at temperatures between 400° C. and 1250° C. for 1 hour to 300 hours under vacuum, air or shield gas for the homogenization or for the stress relaxation. Thereafter the component parts may be solution, stress-relief or precipitation-hardening annealed if necessary at temperatures between 400° C. and 1050° C. for 0.5 hour to 30 hours under vacuum, air or shield gas.

Thereafter the surface may optionally be cleaned or machined by pickling, abrasive blasting, grinding, turning, scalping, milling. Optionally, such a machining may even be carried out partly or completely already before the annealing.

After an annealing, the component parts and components or layers on component parts and components manufactured by means of additive fabrication and other methods described above have a mean grain size of 2 μm to 2000 μm. The preferred range lies between 20 μm and 500 μm.

The term "additive/generative fabrication" may be subdivided into rapid prototyping, rapid tooling, rapid manufacturing or the like, depending on application level.

In general, a distinction is made here among:
3D printing with powders
Selective laser sintering
Selective laser melting
Electron beam melting
Binder jetting
Laser build-up welding
High-speed laser build-up welding
Ultra-high-speed laser build-up welding
Selective electron-beam welding or the like.
The abbreviations used here are defined as follows:
VIM Vacuum Induction Melting
VIGA Vacuum Induction Melting and Inert Gas Atomization The cobalt-chromium alloy according to the invention should preferably be used in areas in which tribological, corrosive and/or oxidative conditions prevail, such as, for example, diverters, valves, especially valve seats, brake disks, especially the wearing surfaces of brakes, rollers, rods and/or replacement for galvanic hard-chromium coatings, in the oil, gas and automobile industry as well as turbine engineering. Beyond that, it is also suitable for the chemical process industry and packaging industry.

The claimed limits for the alloy according to the invention can therefore be justified individually as follows: wear resistance and hardness increase with increasing carbide content. Carbon is primarily responsible for the carbide formation.

A minimum content of 0.40% C is necessary in order to obtain an adequately good wear resistance and high hardness. At higher C contents, the processability and weldability deteriorate. The upper limit is therefore set at 1.50%.

For a good oxidation and corrosion resistance as well as for carbide formation, it is necessary to have an adequate proportion of Cr, at least 24.0%, in the alloy. At higher Cr contents, the undesired phases may be formed and thus reduce the processability of the alloy. The upper limit is therefore set at 32.0%.

The volume percentage of carbides increases with increasing W content. Moreover, the strength of the alloy is increased by solution hardening. A minimum content of 3.0% is necessary, in order to achieve an adequate proportion of carbides. At higher W contents, $M_7C_3$ carbides, which increase the cracking tendency of the alloy in any welding processes, are increasingly formed. Moreover, higher contents very greatly increase the costs. The upper limit is therefore set at 8.0% W.

At adequately high W content, an Mo content of at least 0.1% further increases the stability of desired $M_{23}C_6$ carbides. At higher Mo contents, the processability deteriorates. The upper limit is therefore set at 5.0%.

For a good processability due to adequately high carbide volume percentage, it is necessary that the sum W+Mo be greater than 4.0%. If the sum W+Mo is greater than 9.5%, the costs of the alloy are increased very greatly.

The low cracking tendency during the compaction process is achieved not only by balanced concentrations of C, Cr, Mo, W but also by a reduction of the formation of metastable $M_7C_3$ carbides, which dissolve under temperature influence, as well as coarse MC carbides, which are brittle due to the absence of glide planes and act as crack-initiation sites. Moreover, it is important to keep volume percentages of $M_6C$, sigma and Laves phases as low as possible, in order to ensure the processability of the component parts. Thus CoCr6 in the base composition (see Tables 1 and 2) has approximately 15 volume-% of $M_7C_6$ carbides, which is primarily segregated and from approximately 1100° C. begin to transform to $M_{23}C_6$. The dissolution of $M_7C_6$ blocky carbides and the segregation of $M_{23}C_6$ carbides is complete at approximately 980° C. This phase transformation leads to additional stresses in the material due to the volume changes and crack formation. Therefore the contents of the following elements, which support the formation of above-mentioned phases, are intentionally greatly limited in the alloy according to the invention.

Moreover, Zr (impurity) segregates very strongly during the solidification process and increases the cracking tendency. The content of Zr is therefore specified as max. 0.03%. The Hf content is limited to max. 0.015% and the Ti content (impurity) to max. 0.025%. The sum of Zr, Hf and Ti is limited to ≤0.04%.

Just as Zr, Hf and Ti, Nb and Ta among other ingredients stabilize MC carbides. Therefore the contents of Nb and Ta are respectively limited to <0.5%, wherein the sum of Nb and Ta is limited to ≤0.8%.

At adequately high Ni content, the ductility of the alloy is increased. Moreover, the fcc structure is stabilized. At too-high content, the strength of the alloy is reduced due to the large increase in stacking fault energy. The Ni content is therefore limited to 25.0%.

The content of Fe is limited to max. 15.0%, since at higher contents the strength in Co-base alloys is reduced. In general, Fe has an effect similar to that of Ni. At high contents, however, a reduction of the strength and increase of the ductility may lead to formation of the undesired phases such as Laves and sigma in the alloy. Too-low Fe contents cause increased manufacturing costs for the material. The iron content should therefore be higher than 0.005%.

Manganese is limited to 5.0%, since this element at higher contents may increase the cracking tendency during the welding process. Too-low Mn contents may not ensure the desulfurization effect in the alloy. The manganese content should therefore be higher than 0.005%.

Even very low proportions of aluminum effectively bind oxygen in the melt. At too-high contents, the weldability may again be negatively influenced due to the reactivity of aluminum. The Al content is therefore limited to 0.5%.

Nitrogen is limited to 0.15%, so that the nitride formation is reduced, in order to limit the cracking tendency during the compaction process. Too-low N contents causes increased costs during the manufacture of the alloy. The nitrogen content should therefore be higher than 0.0005%.

Silicon is limited to lower than 0.3%, since this element increases the cracking tendency during the compaction process very strongly on the basis of its segregation behavior. The limitation of the Si content permits the increased C content.

Copper is limited to 0.4%, since this element reduces the oxidation resistance.

The oxygen content should be lower than 0.1%, since this element impairs the mechanical properties of the compacted component parts and/or coatings of the alloy according to the invention. Too-low O contents cause increased manufacturing costs for the powder. The oxygen content should therefore be higher than 0.0001%.

The content of P should be kept as low as possible, since this surface-active element very greatly increases the cracking tendency due to the formation of low-melting eutectics during welding processes. Therefore max. 0.015% is specified.

The content of boron should be kept as low as possible, since this surface-active element very greatly increases the cracking tendency during welding processes. Therefore max. 0.015% is specified.

The contents of sulfur should be kept as low as possible, since this surface-active element forms the low-melting eutectics during any welding processes and enormously supports the cracking tendency. Therefore max. 0.015% S is specified.

Pb is limited to max. 0.005%, since this element reduces the processability. The same is true for Zn, Sn, Bi, V, Y and La.

The volume of $M_{23}C_6$ carbides is limited to maximum 40 volume-%, since at higher volume the ductility of the material is greatly lowered. Too-low volume percentage of $M_{23}C_6$ carbides reduces the wear resistance of the material. Therefore min. 10 volume-% $M_{23}C_6$ is required.

At the same time, the volume of $M_7C_3$ carbides is limited to max. 10 volume-%, since higher phase proportions strongly favor the crack formation.

By means of thermodynamic simulations (JMatPro and ThermoCalc) with the TTNi8 database, an extensive experimental matrix with variation of the chemical compositions was calculated. Exemplary alloys are presented in Tables 1 and 2. In this way, it is possible to explain the relationships between chemical composition and the phase formation. Since thermodynamic simulations without possible diffusion processes during the solidification were used for these calculations, the following residual elements, Cu, P, S, Pb, Zn, Sn, Bi, V, Y, La, which may arrive from raw materials or from the industrial production, were not taken into consideration in the calculations. The upper limits were applied on the basis of the combination of technical experience and economic aspects. In the tables, the alloys CoCr6 and MP75 are indicated as typical compositions. This alloy CoCr6 was taken as the basis for the development according to the invention. CoCr6 in basic version exhibits a complex carbide structure.

The objective of the development according to the invention was to adapt the compositions on the basis of different C contents such that $M_{23}C_6$ carbides are formed between 10.0 volume-% and 40.0 volume-%, in order to ensure high hardness and the wear resistance, and the formation of $M_7C_3$ carbides is limited to max. 10.0 volume-%. On the basis of their unfavorable morphology, the formation of MC and $M_6C$ carbides should be reduced as much as possible (respectively to 2 volume-%) or should be suppressed. Moreover, the alloys should not contain any Laves and sigma phase if at all possible. This is achieved by adaptation of the combination of C, W, Mo, Nb, Ta, Zr, Hf and Ti.

The low contents of Nb and Ta, as in the alloys B-42, B-43 as well as in B-44, already stabilize the MC carbides. The elements Zr, Hf and Ti with lower contents achieve similar effect (alloys B-45, B-46 and B-49). Further alloys in the tables show examples within the claimed composition ranges. An adapted combination of C, W and Mo is necessary in order to achieved a high volume of $M_{23}C_6$ carbides, without the presence of high volume of metastable $M_7C_3$ carbides in the microstructure of the alloy (alloys B-2, B-3, B-5, B-7, B-8, B-11, B-12, B-13, B-14, B-15, B-53, B-55, B-65, B-72). With the increase of the C content (B-70, B-71, B-72), Cr as well as W and Mo content should likewise be increased. This makes it possible to obtain only the $M_{23}C_6$ carbides, even at 1.5 wt-% C (B-72) (see Table 2).

TABLE 1

Chemical composition of exemplary alloys (E: according to the invention. N: not according to the invention. T: prior art) all values in wt-%: [Andere = Other; Rest = the rest; commas should be read as periods]

|  | CoCr6 | MP76 | B-2 | B-3 | B-5 | B-7 | B-8 |
|---|---|---|---|---|---|---|---|
|  | T | T | E | E | E | E | E |
| C | 1.1 | 0.22 | 0.6 | 0.6 | 0.7 | 0.6 | 0.8 |
| Cr | 28.0 | 28.5 | 29.0 | 28.0 | 29.0 | 29.0 | 29.0 |
| W | 4.5 | 0.01 | 6.0 | 5.0 | 5.0 | 6.0 | 5.0 |
| Mo | — | 6.0 | 0.5 | 1.0 | 1.0 | 0.1 | 0.5 |
| Fe | 1.0 | 0.2 | 0.5 | 0.5 | 0.5 | 0.5 | 0.5 |
| Ni | 1.0 | 0.25 | 8.4 | 9.9 | 9.8 | 14.0 | 14.0 |
| Mn | 0.5 | 0.5 | 0.005 | 0.005 | 0.005 | 0.005 | 0.005 |
| Al | — | 0.05 | 0.005 | 0.005 | 0.005 | 0.008 | 0.005 |
| Si | 1.0 | 0.7 | 0.05 | 0.05 | 0.05 | 0.05 | 0.05 |
| Ti | — | 0.01 | 0.002 | 0.002 | 0.002 | 0.002 | 0.002 |
| Nb | — | — | 0.01 | 0.01 | 0.01 | 0.01 | 0.01 |
| N | — | — | 0.01 | 0.01 | 0.01 | 0.01 | 0.01 |
| B | — | — | 0.0005 | 0.001 | 0.001 | 0.001 | 0.001 |
| Zr | — | — | 0.0005 | 0.001 | 0.001 | 0.002 | 0.0005 |
| O | — | — | 0.015 | 0.015 | 0.015 | 0.015 | 0.015 |
| Andere | — | — | — | — | — | — | — |
| Co | Rest | Rest | Rest | Rest | Rest | Rest | Rest |

|  | B-11 | B-12 | B-13 | B-14 | B-15 | B-21 | B-24 |
|---|---|---|---|---|---|---|---|
|  | E | E | E | E | E | N | N |
| C | 0.75 | 0.8 | 0.8 | 0.8 | 0.4 | 04 | 0.8 |
| Cr | 29.0 | 29.0 | 29.0 | 29.0 | 28.0 | 28.0 | 32.0 |
| W | 5.0 | 5.0 | 5.0 | 5.0 | 5.0 | 4.5 | 4.5 |
| Mo | 1.0 | 1.0 | 1.0 | 1.0 | 1.0 | 0.1 | 0.1 |
| Fe | 0.5 | 0.5 | 0.005 | 0.05 | 0.5 | 2.0 | 2.0 |
| Ni | 9.7 | 9.7 | 9.7 | 6.0 | 10.0 | 1.0 | 2.0 |
| Mn | 0.005 | 0.005 | 0.005 | 5.0 | 0.005 | 1.0 | 1.0 |
| Al | 0.005 | 0.005 | 0.005 | 0.1 | 0.005 | 0.1 | 0.1 |
| Si | 0.05 | 0.06 | 0.05 | 0.1 | 0.05 | 1.0 | 1.0 |

TABLE 1-continued

Chemical composition of exemplary alloys (E: according to the invention. N: not according to the invention. T: prior art) all values in wt-%: [Andere = Other; Rest = the rest; commas should be read as periods]

| | | | | | | | |
|---|---|---|---|---|---|---|---|
| Ti | 0.002 | 0.002 | 0.002 | 0.002 | 0.002 | 0.002 | 0.002 |
| Nb | 0.01 | 0.01 | 0.01 | 0.01 | 0.01 | 0.01 | 0.01 |
| N | 0.01 | 0.01 | 0.01 | 0.01 | 0.01 | 0.01 | 0.01 |
| B | 0.002 | 0.001 | 0.003 | 0.001 | 0.002 | 0.001 | 0.001 |
| Zr | 0.0006 | 0.0005 | 0.0005 | 0.0005 | 0.0005 | 0.0005 | 0.002 |
| O | 0.015 | 0.015 | 0.015 | 0.015 | 0.015 | 0.015 | 0.016 |
| Andere | — | — | — | — | — | — | — |
| Co | Rest | Rest | Rest | Rest | Rest | Rest | Rest |

| | B-29 | B-31 | B-33 | B-34 | B-42 | B-43 | B-44 |
|---|---|---|---|---|---|---|---|
| | N | N | N | N | E | N | E |
| C | 0.8 | 0.8 | 0.8 | 0.5 | 0.8 | 0.8 | 0.8 |
| Cr | 24.0 | 28.0 | 29.0 | 20.0 | 28.0 | 29.0 | 29.0 |
| W | 3.0 | 8.0 | 4.5 | 4.5 | 5.0 | 5.0 | 5.0 |
| Mo | 0.1 | 0.1 | 5.0 | 6.0 | 1.0 | 1.0 | 1.0 |
| Fe | 2.0 | 2.0 | 2.0 | 2.0 | 2.0 | 2.0 | 2.0 |
| Ni | 2.0 | 2.0 | 2.0 | 2.0 | 10.0 | 10.0 | 10.0 |
| Mn | 1.0 | 1.0 | 1.0 | 1.0 | 0.3 | 0.3 | 0.3 |
| Al | 0.1 | 0.1 | 0.1 | 0.1 | 0.1 | 0.1 | 0.1 |
| Si | 1.0 | 1.0 | 1.0 | 1.0 | 0.29 | 0.29 | 0.29 |
| Ti | 0.002 | 0.002 | 0.01 | 0.002 | 0.002 | 0.002 | 0.002 |
| Nb | 0.01 | 0.01 | 0.01 | 0.01 | 0.5 | 3.0 | 0.5 |
| N | 0.01 | 0.01 | 0.01 | 0.01 | 0.01 | 0.01 | 0.01 |
| B | 0.001 | 0.002 | 0.00 | 0.003 | 0.002 | 0.002 | 0.002 |
| Zr | 0.001 | 0.001 | 0.004 | 0.003 | 0.001 | 0.001 | 0.001 |
| O | 0.015 | 0.015 | 0.018 | 0.016 | 0.018 | 0.015 | 0.015 |
| Andere | — | — | — | — | Ta 0.5 | Ta 1.0 | Ta 0.3 |
| Co | Rest | Rest | Rest | Rest | Rest | Rest | — |

| | B-45 | B-46 | B-49 | B-53 | B-55 | 8-59 |
|---|---|---|---|---|---|---|
| | E | N | N | E | E | N |
| C | 0.8 | 0.8 | 0.8 | 0.8 | 0.8 | 0.8 |
| Cr | 28.0 | 28.0 | 29.0 | 29.0 | 29.0 | 9.0 |
| W | 5.0 | 5.0 | 5.0 | 5.0 | 6.0 | 5.0 |
| Mo | 1.0 | 1.0 | 1.0 | 1.0 | 10 | 1.0 |
| Fe | 2.0 | 2.0 | 2.0 | 0.1 | 5.0 | 8.0 |
| Ni | 10.0 | 10.0 | 10.0 | 18.0 | 5.0 | 10.0 |
| Mn | 0.3 | 0.3 | 0.3 | 0.3 | 0.3 | 0.3 |
| Al | 0.5 | 0.1 | 0.5 | 0.1 | 0.1 | 0.1 |
| Si | 0.29 | 0.29 | 0.3 | 0.3 | 0.3 | 0.3 |
| Ti | 0.0025 | 0.1 | 0.025 | 0.002 | 0.002 | 0.00 |
| Nb | 0.01 | 0.01 | 0.01 | 0.01 | 0.01 | 0.01 |
| N | 0.03 | 0.03 | 0.01 | 0.01 | 0.01 | 0.01 |
| B | 0.002 | 0.002 | 0.001 | 0.002 | 0.001 | 0.001 |
| Zr | 0.001 | 0.03 | 0.03 | 0.005 | 0.003 | 0.002 |
| O | 0.015 | 0.01 | 0.015 | 0.016 | 0.015 | 0.015 |
| Andere | Hf 0.01 | Hf 0.1 | Hf 0.1 | — | — | — |
| Co | — | — | Rest | Rest | Rest | Rest |

| | B-63 | B-66 | B-69 | B-70 | B-71 | B-72 |
|---|---|---|---|---|---|---|
| | E | N | N | N | N | E |
| C | 0.9 | 1.5 | 1.5 | 1.5 | 1.5 | 1.5 |
| Cr | 20.0 | 29.0 | 28.0 | 32.0 | 32.0 | 32.0 |
| W | 50 | 5.0 | 4.6 | 5.0 | 6.0 | 7.0 |
| Mo | 1.0 | 1.0 | 0.5 | 1.0 | 1.0 | 2.0 |
| Fe | 0.5 | 0.5 | 2.0 | 0.5 | 0.5 | 0.5 |
| Ni | 9.5 | 9.5 | 5.0 | 10.0 | 10.0 | 10.0 |
| Mn | 0.3 | 0.3 | 10 | 0.3 | 0.1 | 0.1 |
| Al | 0.5 | 0.005 | 0.005 | 0.005 | 0.005 | 0.005 |
| Si | 0.1 | 0.1 | 0.1 | 0.1 | 0.1 | 0.1 |
| Ti | 0.002 | 0.002 | 0.002 | 0.002 | 0.002 | 0.002 |
| Nb | 0.01 | 0.01 | 0.01 | 0.01 | 0.01 | 0.01 |
| N | 0.01 | 0.01 | 0.01 | 0.01 | 0.01 | 0.01 |
| B | 0.001 | 0.001 | 0.001 | 0.002 | 0.003 | 0.001 |
| Zr | 0.0005 | 0.0005 | 0.005 | 0.003 | 0.0005 | 0.0005 |
| O | 0.015 | 0.018 | 0.015 | 0.015 | 0.015 | 0.015 |
| Andere | — | — | — | — | — | — |
| Co | Rest | Rest | Rest | Rest | Rest | Rest |

TABLE 2

Phase stability ranges: [Max. Volumen = Max. volume; Stabilitätsbereich = Stability range; Ja/nein = Yes/No; Primar = Primary; ja = yes; nein = no]

| | | M23C6 | | M7C3 | | | | | |
|---|---|---|---|---|---|---|---|---|---|
| | | Solvus-T-r, °C. | Max. Volumen, % | Stabilitätsbereich °C. | Max. Volumen, % | M6C Ja/nein | MC Ja/nein | Sigma Ja/nein | Laves-Ph. Ja/nein |
| Basic CoCr6 | T | 1100 | 23 | Primär-980 | 15 | ja | ja | nein | nein |
| MP75 | T | Primär | 4.7 | nein | nein | nein | nein | ja | nein |
| B-2 | E | Primär | 14 | nem | nein | nein | nein | nein | nein |
| B-3 | E | Primär | 14 | nein | nein | nein | nein | nein | nein |
| B-5 | E | Primär | 17 | nein | nein | nein | nein | nein | nein |
| B-7 | E | 1240 | 14 | Primär-1150 | 10 | nein | nein | nein | nein |
| B-8 | E | Primär | 13 | nein | nein | nein | nein | nein | nein |
| B-11 | E | Primär | 18 | nein | nein | nein | nein | nein | nein |
| B-12 | E | Primär | 18 | nein | nein | nein | nein | nein | nein |
| B-13 | E | Primär | 20 | Primär-1250 | 4 | nein | nein | nein | nein |
| B-14 | E | Primär | 18 | nein | nein | nein | nein | nein | nein |
| B-15 | E | Primär | 10 | nein | nein | nein | nein | nein | nein |
| B-21 | N | 1260 | 9 | Primär-1230 | 5 | ja | nein | nein | ja |
| B-24 | N | Primär | 18 | Primär-1270 | 3 | ja | nein | nein | ja |
| B-29 | N | 990 | 18 | Primär-860 | 12 | ja | ja | nein | nein |
| B-31 | N | Primär | 18 | Primär-1250 | 4 | ja | nein | nein | ja |
| B-33 | N | Primär | 18 | nein | nein | nein | nein | ja | ja |
| B-34 | N | Primär | 13 | nein | nein | nein | nein | ja | ja |
| B-42 | E | Primar | 16 | nein | nein | nein | ja | nein | nein |
| B-43 | N | Primär | 14 | nein | nein | nein | ja | nein | nein |
| B-44 | E | Primär | 16 | nein | nein | nein | ja | nein | nein |
| B-45 | E | Primär | 17 | nein | nein | nein | ja | nein | nein |
| B-46 | N | Primär | 17 | nein | nein | nein | ja | nein | nein |
| B-49 | N | Primär | 18 | nein | nein | nein | ja | nein | nein |
| B-53 | E | Primär | 18 | Primär-1250 | 4 | nein | nein | nein | nem |
| B-55 | E | Primär | 18 | nein | nein | nein | nein | nein | nein |
| B-59 | N | Primär | 18 | nein | nein | nein | nein | ja | nein |
| B-63 | E | Primär | 20 | Primär-1240 | 4 | ja | ja | nein | nein |
| B-65 | N | Primär | 34 | Primär-990 | 18 | nein | nein | nein | nein |
| B-69 | N | 1160 | 35 | Primär-720 | 20 | nsin | nein | nein | nein |
| B-70 | N | Primär | 34 | Primär-1140 | 16 | nein | nein | nein | nein |
| B-71 | N | Primär | 34 | Primär-1160 | 12 | nein | nein | nein | nein |
| B-72 | E | Primär | 3.5 | nein | nein | nein | nein | nein | nein |

In Table 3, first exemplary atomized chemical compositions are presented (akin to B-12 and B-13 with different Ni contents). It is possible, by means of laser-based additive fabrication, to generate component parts having different process parameters without macro-cracks (see FIG. 1).

FIG. 1 shows a material body, built up by means of laser-based additive fabrication, having different process parameters {light-exposure strategies) without macro-cracks.

As predicted in the thermodynamic calculations, no primary $M_7C_3$ carbides as well as eutectic solidification were detected. The carbide precipitation of $M_{23}C_6$ is induced by means of heat treatment. Advantages of this are that carbide size and distribution may be controlled by a heat treatment.

TABLE 3

First exemplary atomized chemical compositions.

| | P10331 E | P10332 E | P10333 E | P10376 E | P10377 E |
|---|---|---|---|---|---|
| C | 0.78 | 0.77 | 0.80 | 0.82 | 0.80 |
| Cr | 26.92 | 28.97 | 28.62 | 28.34 | 27.64 |
| W | 4.01 | 4.07 | 4.28 | 4.19 | 4.22 |
| Mo | 1.48 | 1.43 | 1.45 | 1.56 | 1.44 |
| Fe | 0.05 | 0.04 | 0.05 | 0.08 | 0.08 |
| Ni | 10.06 | 9.91 | 9.92 | 18.68 | 20.11 |
| Mn | 0.001 | 0.001 | 0.012 | n.a. | n.a. |

TABLE 3-continued

First exemplary atomized chemical compositions.

| | P10331 E | P10332 E | P10333 E | P10376 E | P10377 E |
|---|---|---|---|---|---|
| Al | 0.015 | 0.013 | 0.015 | n.a. | n.a. |
| Si | 0.01 | 0.01 | 0.03 | 0.02 | 0.02 |
| Ti | 0.001 | 0.001 | 0.001 | n.a | n.a. |
| Nb | 0.001 | 0.002 | 0.001 | 0.01 | 0.01 |
| N | 0.002 | 0.002 | 0.002 | 0.002 | 0.002 |
| B | 0.0005 | 0.0005 | 0.0005 | 0.001 | 0.001 |
| Zr | 0.001 | 0.001 | 0.001 | | |
| O | 0.010 | 0.011 | 0.011 | 0.009 | 0.009 |
| Andere | n.a. | n.a. | n.a. | n.a. | n.a. |
| Co | Rest | Rest | Rest | Rest | Rest | n.a. = not analyzed.
Andere = Others;
Rest = the rest

The invention claimed is:

1. A method for manufacture of a powder from a titanium-free cobalt-chromium alloy,
wherein the alloy comprises (in wt-%)
C 0.40-1.50%
Cr 24.0-32.0%
W 3.0-8.0%
Mo 0.1-5.0%, wherein 4.0≤W+Mo≤9.5, with the contents of W and Mo in wt-%, is satisfied Nb max. 0.5%
Ta max. 0.5%, wherein Nb+Ta≤0.8, with the contents of Nb and Ta in wt-%, is satisfied
Ni 5-21.0%
Fe 0.005-15.0%, wherein Ni+Fe>3.0, with the contents of Ni and Fe in wt-%, is satisfied
Mn 0.005-5.0%
Al max. 0.5%
N 0.0005-0.03%
Si<0.3%
Cu max. 0.4%
O 0.0001-0.1%
P max. 0.015%
B max. 0.015%
S max. 0.015%
Co the rest and manufacturing-related impurities, especially
Zr max. 0.03%
Ti max. 0.025%,
wherein
the powder is produced in a vacuum inert-gas atomization system (VIGA), and in the vacuum inert-gas atomization system, the alloy is smelted in a vacuum induction smelting furnace to form a molten melt and the molten melt is held for 20 minutes to 2 hours for homogenization and passed into a casting gate, which leads to a gas stream having a gas flow rate of 2 to 150 $m^3$/min, in which molten metal of the molten melt is atomized at a metal flow rate during atomization of 0.5 to 80 kg/min to metal particles under pressure of 5 to 100 bar with inert gas, the molten melt being heated in a melting crucible at 5 to 400° C. above melting point and due to rapid cooling, the metal particles solidify in a form of spherical particles, and a gas phase is then separated from the powder in a cyclone, after which the powder is packaged.

2. The method according to claim 1, further comprising using the powder in a generative fabrication method and/or in combination with a hot isostatic pressing (HIP) method, or using the powder for build-up welding and/or coating.

3. The method according to claim 1, further comprising using the powder for generation of a component part and/or a coating under tribological, corrosive or oxidizing conditions or combinations of such conditions.

* * * * *